US006606908B2

United States Patent
Johann et al.

(10) Patent No.: US 6,606,908 B2
(45) Date of Patent: Aug. 19, 2003

(54) INERTIAL SENSOR FOR THE MOUNTING AND CHECKING OF AN INERTIAL REFERENCE IN A SATELLITE

(75) Inventors: Ulrich Johann, Salem (DE); Hartmut Joerck, Wiemersdorf (DE)

(73) Assignee: Astrium GmbH, Friedrichshafen (DE)

(*) Notice: Subject to any disclaimer, the term of this patent is extended or adjusted under 35 U.S.C. 154(b) by 21 days.

(21) Appl. No.: 09/892,782

(22) Filed: Jun. 28, 2001

(65) Prior Publication Data

US 2002/0036251 A1 Mar. 28, 2002

(30) Foreign Application Priority Data

Jun. 28, 2000 (DE) .......................... 100 31 542

(51) Int. Cl.[7] .............................. G01P 15/08; G06F 7/00
(52) U.S. Cl. ...................................... 73/514.19; 701/13
(58) Field of Search ...................... 73/514.01, 514.19, 73/514.26, 504.01, 655, 657; 342/355, 357.01, 357.08, 357.11; 244/158 R, 164, 171; 701/13, 220; 702/150; 356/138, 139.01, 139.03

(56) References Cited

U.S. PATENT DOCUMENTS

| 3,275,835 A | 9/1966 | Morrison |
| 3,710,279 A | 1/1973 | Ashkin |
| 4,170,904 A | 10/1979 | Fischell et al. ............. 74/5.6 E |
| 4,384,487 A | * 5/1983 | Browning ................ 73/382 G |
| 4,799,752 A | * 1/1989 | Carome ....................... 73/657 |
| 5,546,309 A | * 8/1996 | Johnson et al. ............. 244/171 |
| 6,018,390 A | * 1/2000 | Youmans et al. ........ 73/514.01 |

FOREIGN PATENT DOCUMENTS

| DE | 3606875 | 4/1989 |
| DE | 199 21 390 A1 | 5/1999 |
| EP | 0 569 994 A2 | 5/1993 |
| JP | 2-74499 A | 3/1990 |
| WO | WO 90/08962 | 8/1990 |

* cited by examiner

Primary Examiner—Helen Kwok
(74) Attorney, Agent, or Firm—Crowell & Moring LLP (57) ABSTRACT

An inertial sensor includes an inertial reference for determining the attitude and position of a satellite or satellite parts. A test mass is situated in a space which is essentially free of electric and magnetic fields and is enclosed by a housing, and optical measuring sections are set up between reference elements on the housing and on the test mass, for determining the attitude and/or position of the test mass relative to the reference elements on the housing. A measuring arrangement is situated outside the housing for the optical measuring sections. The optical measuring sections are constructed as optical interferometric measuring elements; and the attitude and position of the test mass can be adjusted by means of the pressures of light exerted on the optical interferometric measuring sections upon the test mass.

24 Claims, 5 Drawing Sheets

INERTIAL SENSOR FOR THE MOUNTING AND CHECKING OF AN INERTIAL REFERENCE IN A SATELLITE

BACKGROUND AND SUMMARY OF THE INVENTION

This application claims the priority of German patent document 100 31 542.9, filed Jun. 28, 2000, the disclosure of which is expressly incorporated by reference herein.

The invention relates to an inertial sensor as an inertial reference for determining the attitude and position of satellites and satellite parts.

A new generation of scientific space missions, particularly based on high-resolution optical instruments, requires a very precise knowledge of the residual acceleration, the relative positions and the attitude as well as attitude fluctuations of satellites and satellite parts. The degrees of freedom associated therewith are influenced to an extent which should not to be neglected, by both internal interfering influences (for example, eccentricity of the center of gravity or change of the moment of inertia) and external interfering influences (for example, solar wind and residual magnetic fields). At the European level, missions which are relevant in this respect are GAIA, IRSI, LISA, DIVA, GOCE and STEP.

So far, acceleration sensors, which are connected with a test mass by way of a soft coupling, have been used to determine the residual acceleration of satellites and satellite parts. For determining the attitude and position, high-resolution optical astral sensors (in the form of, for example, CCD cameras, such as the Hubble telescope) are predominantly used.

Inertial sensors have been used only as an inertial position reference. To determine the position of satellites or satellite parts, the position of a test mass is measured relative to its satellite environment. The position of the test mass is normally determined capacitively and checked by means of electric fields. For this purpose, the generally metallic test mass is electrostatically charged. The electrostatic charging as well as the induced charge polarizations cause forces and moments (for example, Lorentz force by movement in an external magnetic field or electric dipole moments) which interfere with the inertial movement of the test mass. As a result of stray electric fields (parasitic capacitances), particularly in the case of large distances (in the range of several millimeters) between the test mass and the reference surfaces (electrodes), a non-linear behavior of the distance measurement will occur. To minimize the direct effect of the magnetic field on the test mass, a material of low susceptibility is selected for the test mass. Another measure for the shielding with respect to magnetic fields is the use of $\mu$-metals; however, although they have a high magnetic permeability, the latter are considerably impaired in their effect as a result of starting vibrations of the satellite.

U.S. Pat. No. 4,170,904 discloses an inertial sensor in which a test mass is situated in a closed housing that shields it from interfering external influences (such as the radiation pressure of the sun, electric static fields). For controlling the attitude and position, the test mass is exposed to a controllable magnetic field generated by means of coils.

German Patent Document 199 21 390 A1 describes a positioning system for a measuring device of a satellite, in which the entire measuring device, including the electronic system or at least parts thereof, is uncoupled from the satellite surrounding the measuring device. Thus, it is possible to uncouple the measuring device from external interferences. However, the high constructional expenditures represent a disadvantage.

In European Patent Document EP 0 569 994 A2, an inertial sensor is described in which a test mass is situated in a space that is free of electric and magnetic fields, and is surrounded by a housing. Optical measuring sections determine the attitude and position of the test mass, which is adjusted by means of low-frequency or high-frequency sound waves emitted from a wave projector and directed against the movement of the test mass. The disadvantage of this arrangement is its cost-intensive construction, as well as the inexact measurement of the attitude and the position of the test mass.

It is an object of the invention to provide an inertial sensor which achieves an improved, highly precise determination of the attitude and position of satellites and satellite parts, and which is not susceptible to external interfering influences.

This and other objects and advantages are achieved by the inertial sensor arrangement according to the invention, in which the optical measuring sections are constructed as optical interferometric measuring sections. The attitude and position of the test mass can be adjusted by means of the pressure of light exerted upon the test mass in the optical interferometric measuring sections. On the one hand, the test mass can inertial float freely in the housing, and ideally can be subjected only to the gravitational interaction during the process. Or, it can conformably with the housing, rotate about a joint axis at an identical nominal angular velocity.

In order to avoid the creation of radiation gradients inside the housing (which may result in accelerations in the range of from $10^{-15}$–$10^{-13}$ m/s$^2$), in an advantageous embodiment the housing enclosing the test mass is thermally constructed as a black body (for example, by insulation). Thus, scattered light, which may have been introduced into the housing by the optical measuring sections, is uniformly thermalized (Ulbricht globe).

The housing should be mechanically stabilized because it contains the reference elements and should consist, for example, of glass ceramics (Zerodur® or ULE®). In addition, the housing may be shielded against residual magnetic fields.

On the interior surface of the housing, the housing-side reference elements are situated for the relative attitude and position determination of the test mass. In addition, the interior surface of the housing can be covered with a conductive coating (such as gold) in order to eliminate electrostatic fields. Furthermore, the housing may be evacuated or filled with gas.

In another preferred embodiment, the surface of the test mass can be constructed as a reflector, for example, in a metallized manner. As a particularly advantageous embodiment, optical reflector elements, such as mirrors, can be applied to the surface of the test mass. (These reflector elements may have a planar or spherically centered design.) The surface of the test mass or the reflector elements applied to the surface form an end mirror of one of the optical interferometric measuring sections.

The test mass has an advantageously symmetrical construction and has the shape of a cube, a right parallelepiped, a tetrahedron, a disk or a ball. Its shape depends on the requirements for compactness (minimizing of the residual interfering elements) as well as on the desired moments of inertia in the axes of rotation.

In particular, the shape of the test mass is independent of the selected optical arrangement for determining the attitude and position. The material of the test mass is determined to minimize the interfering influences. Important features for selecting the material are:

A minimal magnetic susceptibility, a high thermal and electric conductivity, a high density, and a low thermal coefficient of expansion.

The determination of the attitude and position of the test mass, along the desired degrees of freedom and relative to the reference elements on the housing, takes place by means of laser-metrological methods that are known per se. Suitable methods are described in the literature [1] E. Morrison, B. J. Meers, D. I. Robertson and H. Wald; "Automatic alignment of optical interferometers"; Applied Optics; Vol. 33; No. 22; 1994; p5041; [2] N. M. Sampas and D. Z. Anderson; "Stabilization of laser beam alignment to an optical resonator by heterodyne detection of off-axis modes"; Applied Optics; Vol. 29; No. 3; 1990; p394; [3] D. Z. Anderson; "Alignment of optical cavities"; Applied Optics; Vol. 23; No. 17; 1984; p2944; and [4] B. Hines, M. Colavita, K. Wallace and A. Poulsen; "Sub-nanometer laser metrology-some techniques and models"; Proceeding of high resolution imaging by interferometry 1; Garching; 1991; p1195.

Particularly the respective following measuring methods can be used:

Heterodyne interferometry in the following also called V1;

classic interferometry by means of a Michelson interferometer (V2); and use of an optical resonator (Fabry-Perot) with a monitoring of the resonator modes by means of heterodyne methods (V3).

By means of laser metrological methods, relative distance measurements can be carried out with a precision around 10 pm at rates of approximately 1 s. The precision of the angle measurements is below 0.1 nrad.

During the measurement, as a result of the optical interferometric measuring sections aligned with the test mass, a pressure of light in the order of 0.0035 $\mu$N/W is exerted on the test mass. In a particularly advantageous construction, these optical measuring sections are aligned with respect to one another such that the pressures of light exercised by the individual optical measuring sections upon the test mass compensate one another. In this case, the optical measuring sections are advantageously aligned with the mass center and the geometric center of the test mass.

In a preferred embodiment, the position and attitude of the test mass can be adjusted by variation of the pressure of light in the individual optical measuring sections.

By appropriate adaptation of the resonator in a preferred embodiment of method V3, the position and the attitude of the test mass can be controlled in a precise manner. The precise adjustment of the test mass takes place by the targeted excitation of the longitudinal and transverse resonator modes forming in the resonators, while utilizing the resonance step-up which leads to increased light pressure value while the laser light output is lower (a few mWs). Furthermore, the measurement of the resonator modes permits a precise determination of the attitude and position of the test mass. The high tuning precision of the resonator modes as well as the high quality of the resonators are also found to be advantageous.

The advantageous alignment of the optical interferometric measuring sections as well as the advantageous selection of the laser working frequencies on a flank of a resonator mode permits in method V3 an inherent self-centering of the test mass by the automatically adjusting variation of the light pressure in the resonator modes.

The advantages of laser-metrological methods in comparison to capacitive measuring devices are:

The elimination of the interfering influences of electric fields, whereby a better uncoupling of the satellite body is permitted;

a high resolution into the picometer range;

an extended linear characteristic curve around the working point;

the determination of the attitude and position of the test mass in up to 6 degrees of freedom;

selection of the distance between the test mass and the housing (reference elements), within a wide range ($\mu$m to m).

Additional advantages and advantageous embodiments of the invention will be described in the following by means of drawings which illustrate the basic construction of the optical inertial sensor according to the invention in an embodiment A1 and an embodiment A2. A1 is an inertial sensor according to the invention as a position and rotation reference for an inertially resting or slowly rotating satellite; and A2 is an inertial sensor according to the invention as a joint position reference of two or more optical interferometric measuring sections situated at a variable angle.

Other objects, advantages and novel features of the present invention will become apparent from the following detailed description of the invention when considered in conjunction with the accompanying drawings.

DETAILED DESCRIPTION OF THE DRAWINGS

By means of the systems according to the invention, it is possible to determine the attitude and position of the test mass in up to 6 degrees of freedom.

Figure 1:
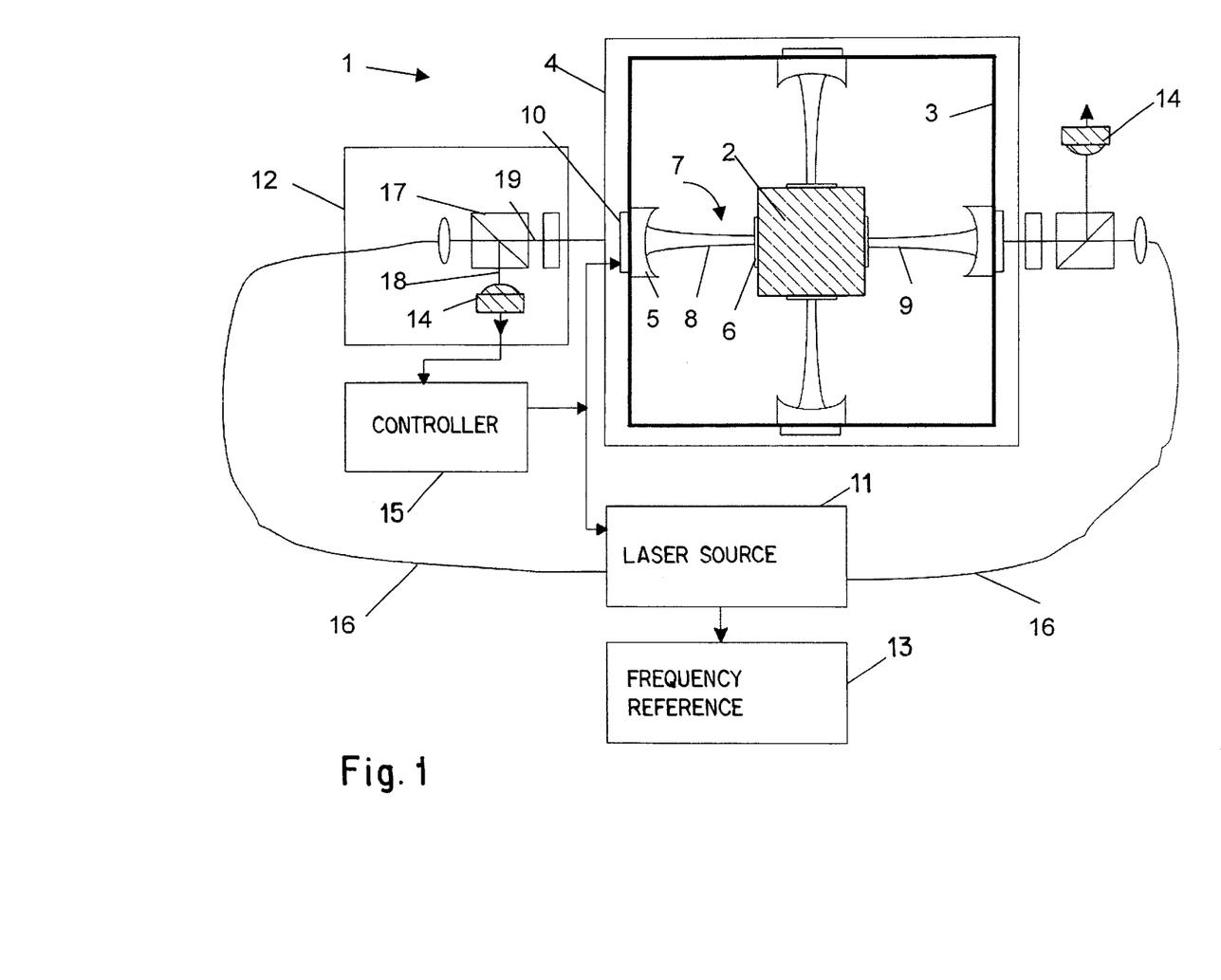
FIG. 1 is a view of a system of the invention according to embodiment A1 for implementing a measuring method according to V3.

FIG. 1 shows the functional components of the optical inertial sensor 1 according to embodiment A1 of the invention. (For reasons of clarity, only the functional components for determining one degree of freedom are illustrated.) The illustrated measuring methods are, for example, method V3 of an optical Fabry-Perot resonator with a laser-interferometric measuring and control arrangement according to the heterodyne method.

The test mass 2, which, for example, has the shape of a cube, is surrounded by a housing 3 to which a shield 4 (for example, $\mu$-metal) is applied, which shields against electromagnetic fields. Reference elements 5 and 6 (for example, mirrors) situated on the inner surface of the housing 3 as well as the surface of the test mass 2 form the individual Fabry-Perot resonators 7. On the one hand, the resonators 7 are used as optical measuring sections 8 and, on the other hand, as compensation sections 9 for the compensation of the pressure exerted by light on the test mass 2. In addition, piezo-actuators or electro-optical elements 10 for tuning the resonators 7 are situated on the housing-side reference elements 5.

The laser-interferometric measuring and control arrangement consists of a frequency-stabilized laser source 11, which is common to all optical sections (for example, an Nd:YAG laser with a power of less than 100 mW), an interferometer lens system 12, a frequency reference 13 for the frequency stabilization of the laser source as well as a detector 14. The detector 14 is followed by a controller 15 for controlling the laser frequency, and the piezo-actuator 10. In addition, the piezo-actuators 10 can be controlled independently of the detector 14 by the laser source 11.

The laser light of the laser source 11 is conducted by way of a single-mode, polarization-receiving optical fiber cable 16 to the interferometer lens system 12, where it is divided in a polarization beam divider 17 into two partial beams. One partial beam 18 is guided to the detector 14; the other partial beam 19 enters the resonator 7 between the reference elements 5 and 6.

As described above, longitudinal and transversal resonator modes are formed within the resonators 7 as a function of the resonator length, which can be adjusted by way of the piezo-actuators, and of the laser frequency. A small portion of the laser output stored in the resonators 7 is coupled by the housing-side reference elements 5, for example, by partially transmitting mirrors, out of the resonators 7. In the interferometer lens system 12, this coupled-out laser beam is superimposed by the partial beam 18 and in the process generates an interference pattern which is imaged on the detector 14 and detected.

As described above, a self-regulating positioning of the test mass 2 can be achieved by means of a Fabry-Perot resonator 7. By means of a change of the laser frequency, a resonator tuning by means of the piezo-actuators 10 or by a relative displacement of the test mass 2, a position interference ΔL of the test mass 2 is induced in the resonators 7. As a result, the differential light pressure in the individual resonators is changed.

A targeted excitation of the resonator modes while utilizing the resonance step-up leads to an increase of the light pressure by the factor 1,000. As a result, a restoring force is exerted on the test mass 2 in the optical sections 8 and 9, so that the test mass 2 is self centered in the housing 3.

Figure 2:
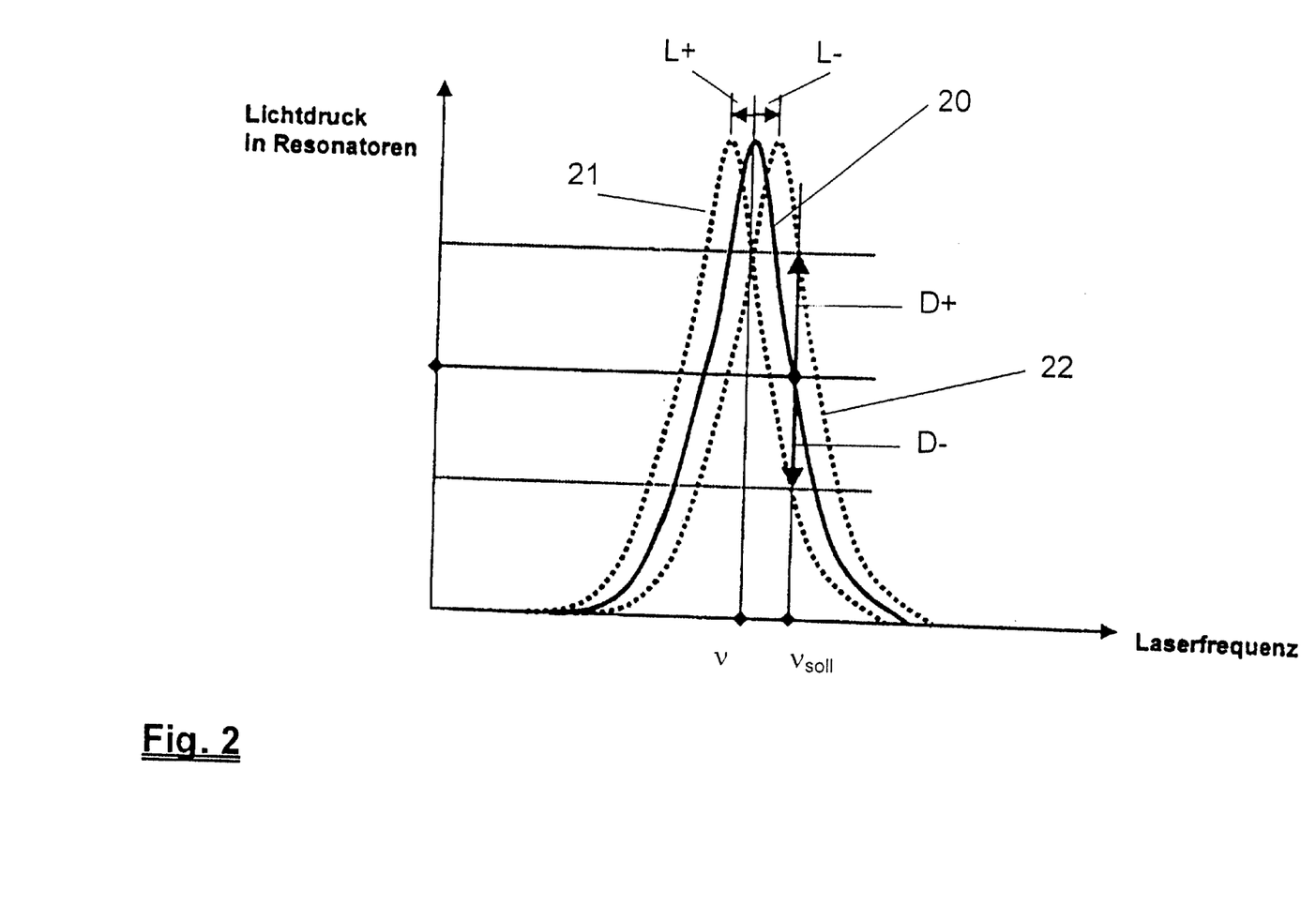
FIG. 2 illustrates the principle of the position and attitude control by means of pressure of light according to measuring method V3.

The principle of the light-pressure-induced position and attitude setting is illustrated in FIG. 2, in which the light pressure in the resonator 7 is entered opposite the laser frequency. The solid curve, reference number 20, indicates the resonator mode at a resonance frequency v, which resonator mode is formed at a desired resonator length L in the optical measuring section 8 and the corresponding compensation section 9. The dotted curves 21 and 22, on the other hand, show the resonator modes which formed in the case of a position interference ΔL of the test mass 2. Reference number 21 indicates the resonator mode in the optical measuring section 8, and reference number 22 indicates the resonator mode in the corresponding compensation section 9.

The position interference ΔL causes a change of the resonator lengths in the optical sections 8 and 9. In FIG. 2, this indicates an extension L+ of the optical section 8 and a shortening L− of the optical section 9, the deviation Δv of the resonance frequency in the optical sections 8 and 9 being calculated according to the formula $$\Delta v = \left(-\frac{C}{2L^2}\right)\Delta L.$$

By the operation of the laser frequency $u_{des}$ on the higher-frequency flank of a longitudinal resonator mode, the differential light pressure is controlled in the optical sections 8 and 9. In FIG. 2, this indicates an increase D+ of the differential light pressure upon the test mass 2 in the optical section 9 and a reduction D− of the differential light pressure in the optical section 8, so that a restoring force is obtained which counteracts the interference.

By an appropriate selection and fixing of the laser frequency, the light pressures upon the test mass 2 in the optical sections 8 and 9 are compensated at the desired position and generate suitable restoring forces in the case of longitudinal position interferences. Inversely, by tuning the laser frequency, particularly also by the operation on the low-frequency flank, a desired acceleration of the test mass can be achieved.

Figure 3A:
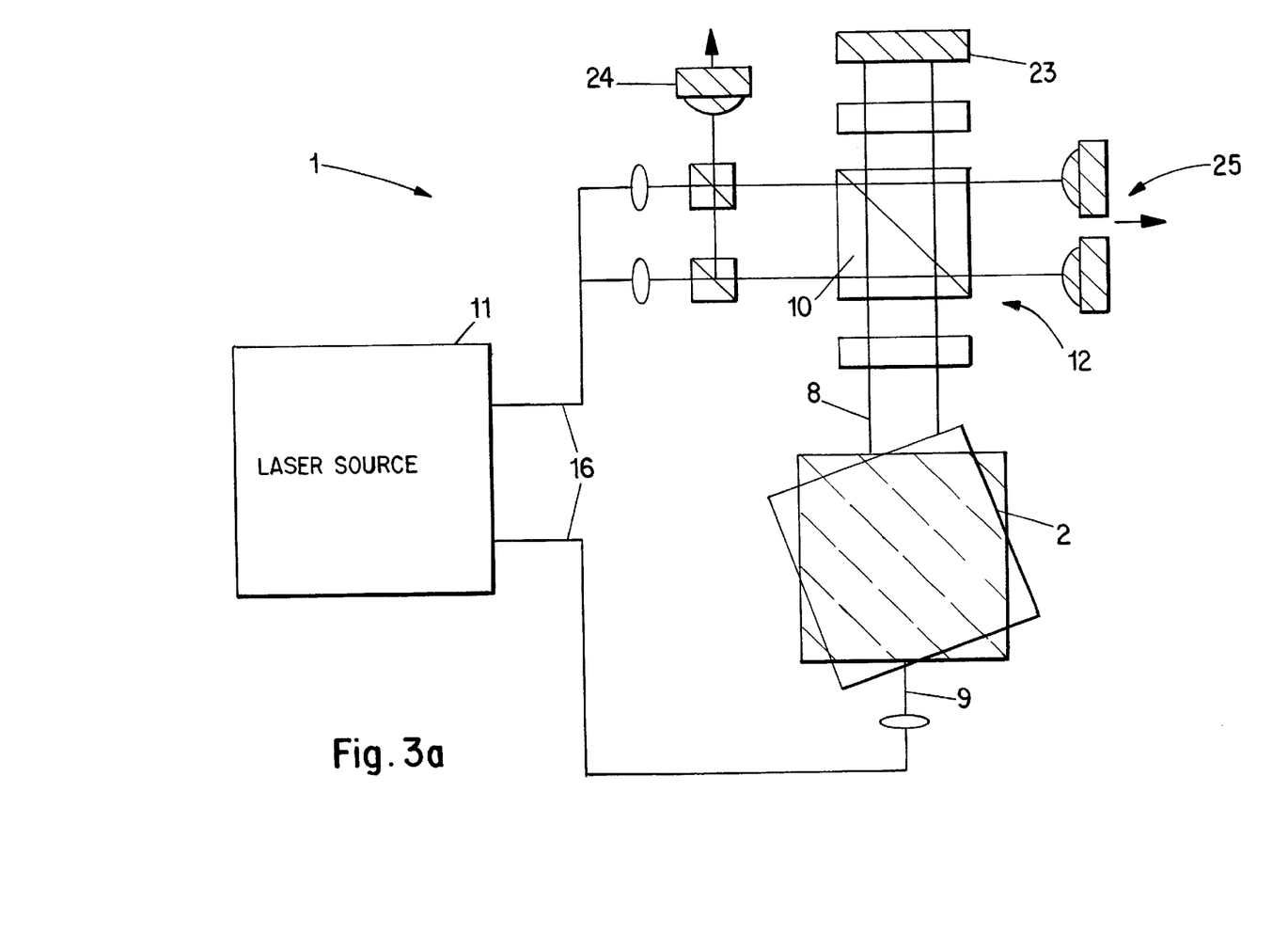
FIG. 3a is a view of a system of the invention according to embodiment A1 for the implementation of a measuring method according to V1.

FIG. 3a shows an embodiment of an inertial sensor 1 according to embodiment A1 of the invention, for implementing the position and attitude measurement by means of laser heterodyne interferometry (V1). For reasons of clarity, the figure shows the functional components for the position and attitude measurement in one degree of freedom respectively.

Similar to the construction in FIG. 1, the system according to the invention consists of a test mass 2, a laser source 11, such as an Nd:YAG-laser, for each degree of freedom, of an interferometer lens system 12 with an optical heterodyne interferometric measuring section 8 on the output side as well as a pertaining compensation section 9. As described in FIG. 1, the laser light is conducted through a single-mode polarization-obtaining optical fiber cable 16.

The interferometer lens system 12 is similar to the construction of a conventional Michelson interferometer having a polarization beam divider 17, a fixed reference mirror 23 as well as the test mass 2 as a mirror which can be changed in its position and attitude. On the one hand, a reference detector 24 is connected to the input side of the interferometer lens system 11 and a heterodyne detector 25 is connected to the output side.

In the optical measuring section 8, both the position and tilting of the test mass are determined by means of at least 3 partial beams. The pressure exerted by the partial light beams on the test mass 2 is compensated by the laser beam in the compensation section 9. In this case, the controllable attitude angle range is limited by the adjusting requirements of the laser interferometer.

Figure 3B:
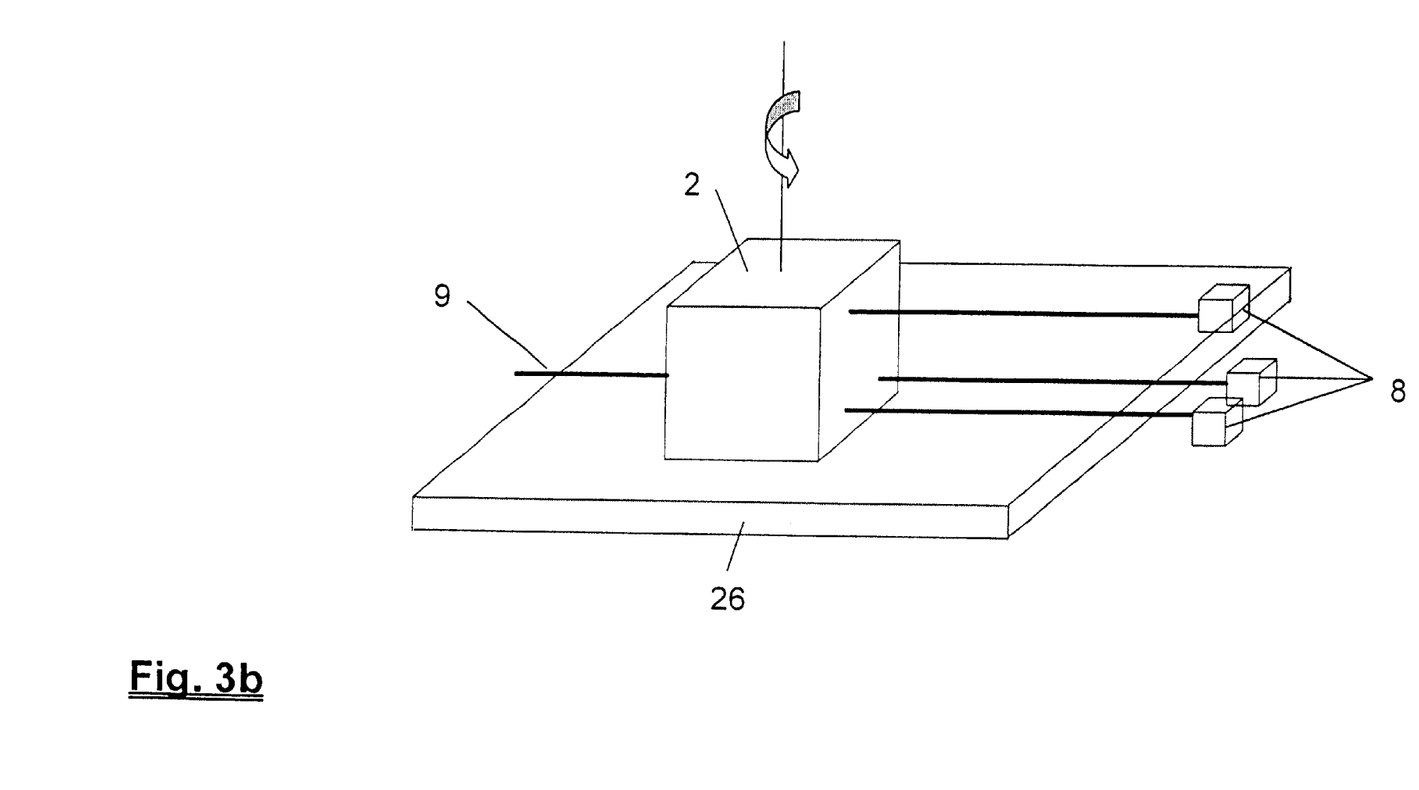
FIG. 3b shows the optical measuring sections according to FIG. 3a aligned with the test mass.

FIG. 3b illustrates a test mass 2 which is constructed, for example, in the shape of a cube and has, for example, 3 optical measuring sections 8 for determining the position and attitude of the test mass. By means of the 3 optical measuring sections 8, a precise determination of two angles can also be carried out by which the test mass is tilted out of the initial position. In this case, the test mass may be situated on a slowly rotating platform 26 and rotate with this platform 26.

Figure 4:
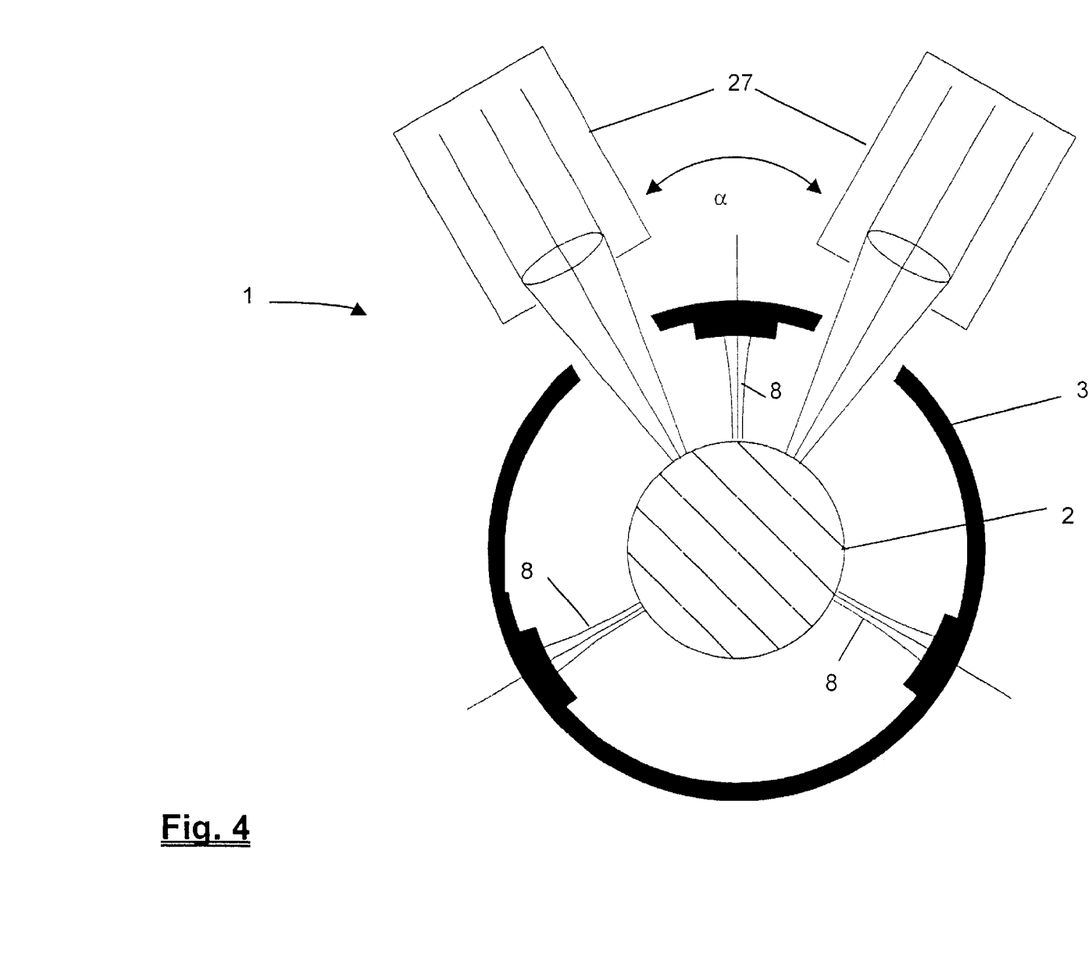
FIG. 4 illustrates a system of the invention according to embodiment A2 for the implementation of a measuring method according to V3.

FIG. 4 shows a further advantageous application (embodiment A2) of the inertial sensor 1 according to the invention, which can be used as a common and continuously operated position reference for several satellites or satellite parts. Between the satellites or satellite parts (not shown) outside the housing and the test mass 2, additional laser-interferometric measuring sections 27 are provided.

The angle α between the individual laser-interferometric measuring sections can be variable with respect to time.

In addition, by means of the optical measuring sections 27, the spacing between the satellites within a satellite constellation can be determined (typically several million kilometers). This affords the advantage of a complete separation of the inertial reference and laser interferometers in satellite constellations.

Otherwise, the principle of this embodiment corresponds to that described in FIG. 1. The test mass 2 is situated inside a housing 3 and can rotate about an arbitrary axis or rest inertially. The housing 3 has additional openings for the laser-interferometric measuring sections 27. Advantageously, the test mass 2 and the housing 3 have a spherical construction. A further development of the test mass 2 is also conceivable in which only the reference surfaces of the optical measuring sections 27 on the test mass 2 have a spherical construction.

By means of the measuring sections 8 constructed between the test mass 2 and the housing 3 according to the laser-metrological method V3 (which measuring sections 8 can also be used as compensation sections), the degrees of freedom of the position of the test mass 2, as described above, can be checked and controlled independently of one another. The measuring sections 8 are advantageously arranged at a fixed angle, for example, in the shape of a tetrahedron, with respect to the test mass 2.

The optical measuring sections 27 and 8 are advantageously aligned with the center of the test mass 2, in which case the alignment of the optical measuring section 8 with the optical center of the test mass 2, is described above, is checked by measuring the excitation of the resonator modes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An inertial sensor for determining the attitude and position of a satellite or satellite parts, comprising
    a test mass situated in a space which is substantially free of electric and magnetic fields; and
    a housing enclosing the space;
    reference elements arranged on the housing and on the test mass;
    optical measuring sections set up between the reference elements for determining at least one of attitude and position of the test mass relative to the reference elements on the housing; and
    measuring apparatus situated outside the housing for cooperating with the optical measuring sections; wherein
    the optical measuring sections comprise optical interferometric measuring sections; and
    the attitude and position of the test mass can be adjusted by pressures of light exerted in the optical interferometric measuring sections upon the test mass.

2. The inertial sensor according to claim 1, wherein the test mass is inertially free floating.

3. The inertial sensor according to claim 1, wherein the test mass rotates together with the housing about a common axis at an identical nominal angular velocity.

4. The inertial sensor according to claim 1, wherein the housing comprises a black body.

5. The inertial sensor according to claim 1, wherein a range of distance between the test mass and the housing extends to several meters.

6. The inertial sensor according to claim 1, wherein one of the following is true:
    a surface of the test mass is constructed as a reflector; and
    spherical centered optical reflector elements are applied to a surface of the test mass in an area of the reference elements.

7. The inertial sensor according to claim 6, wherein the surface of the test mass or the optical reflector elements form an end mirror of one of the optical interferometric measuring sections.

8. The inertial sensor according to claim 1, wherein the optical interferometric measuring sections are arranged relative to one another such that pressure of light exerted in individual measuring sections upon the test mass are mutually compensated.

9. The inertial sensor according to claim 8, wherein optical axes of the optical interferometric measuring sections are aligned with a mass center and geometrical center of the test mass.

10. The inertial sensor according to claim 1, wherein at least one of position and attitude of the test mass is adjustable by variation of light pressure in the optical interferometric measuring sections.

11. The inertial sensor according to claim 1, wherein the optical interferometric measuring sections comprise a branch of a heterodyne interferometer.

12. The inertial sensor according to claim 1, wherein the optical measuring sections are a branch of a Michelson interferometer arrangement.

13. The inertial sensor according to claim 1, wherein the optical measuring sections are passive optical resonators.

14. The inertial sensor according to claim 13, wherein
    longitudinal and transversal resonator modes can be adjusted in the optical resonators; and
    by measurement by the optical resonators, at least one of position and attitude of the test mass can be determined.

15. The inertial sensor according to claim 14, wherein light pressure in individual modes can be varied by resonator tuning by means of piezo or electro-optical elements arranged in the optical measuring sections.

16. The inertial sensor according to claim 14, wherein light pressure in individual modes can be changed by variation of laser frequency.

17. The inertial sensor according to claim 14, wherein light pressure in individual modes can be changed by a targeted excitation of longitudinal and transversal resonator modes while utilizing a resonator step-up.

18. The inertial sensor according to claim 14, wherein light pressure in individual modes can be changed by one of relative displacement and tilting of the test mass.

19. The inertial sensor according to claim 13, wherein the optical interferometric measuring sections are wired such that a self-centering of the test mass occurs within the optical measuring sections as a result of variation of light pressure.

20. The inertial sensor according to claim 19, wherein the self-centering is caused by operation of laser frequency on a higher-frequency flank of a longitudinal resonator mode.

21. The inertial sensor according to claim 1, wherein at least one of position and attitude of the test mass can be determined in at least one of 6 degrees of freedom.

22. The inertial sensor according to claim 1, further comprising:

at least two additional optical measuring sections between the test mass and one point respectively outside the housing; and wherein said optical measuring sections in the process are aligned with an optical center and a mass center of the test mass.

23. The inertial sensor according to claim 22, wherein an angle between the optical measuring sections is variable.

24. The inertial sensor according to claim 1, wherein the test mass is at least partially spherical.

* * * * *